United States Patent [19]
Lowrance

[11] 3,810,661
[45] May 14, 1974

[54] TRAILER HITCH

[76] Inventor: Larry D. Lowrance, Rt. 1, Robinson, Ill. 62454

[22] Filed: Oct. 5, 1972

[21] Appl. No.: 295,129

[52] U.S. Cl. ...... 280/415 B, 280/415 A, 280/423 R, 280/482
[51] Int. Cl. ............................................. B62d 53/04
[58] Field of Search ........ 280/415 A, 415 B, 423 R, 280/482

[56] References Cited
UNITED STATES PATENTS

| | | | |
|---|---|---|---|
| 2,635,892 | 4/1953 | Shutter | 280/512 X |
| 3,411,644 | 11/1968 | Cook | 214/450 |
| 3,336,050 | 8/1967 | Dale | 280/423 R |
| 2,393,016 | 1/1946 | Black | 280/423 B X |
| 2,475,443 | 7/1949 | Bill | 280/423 R X |
| 2,628,106 | 2/1953 | Sturwold | 280/423 B X |

Primary Examiner—Leo Friaglia
Attorney, Agent, or Firm—Hill, Gross, Simpson, Van Santen, Steadman, Chiara & Simpson

[57] ABSTRACT

In a trailer hitch a U-shaped tow beam has a ball and socket connector at one end thereof for connection to the bed of a pickup truck at one end of the tow beam, and a tongue receiving assembly secured to the other end of the tow beam. The tongue receiving assembly is bifurcated and provided with U bolts for releasably securing the tongue of a trailer thereto. The tow beam is provided with means for adjusting the relative elevation of its two ends, and with means for permitting the tow beam to be swivelled about a vertical axis, for storage adjacent the front portion of the trailer.

11 Claims, 5 Drawing Figures

PATENTED MAY 14 1974

3,810,661

TRAILER HITCH

BACKGROUND OF THE INVENTION

1. Field of the Invention

The present invention relates to a trailer hitch, and more specifically to a trailer hitch adapted for use with a pickup truck.

2. Prior Art

There are many devices known in the prior art for releasably securing a trailer to a towing vehicle so that the towing vehicle may be used either alone or with more than one trailer. When a pickup truck is used for the towing vehicle, it is possible to support the forward or towing end of the hitch on the bed of the truck in such a way that it can swivel about a vertical axis bisecting the rear axle of the pickup truck. Such an arrangement greatly facilitates turning and backing maneuvers. To accomplish this it is necessary to provide a U-shaped tow beam having its forward end connected to a point on the bed of the pickup truck which lies above the rear axle. The U-shape of the beam is necessary to allow clearance over the tailgate of the truck, and connection to the tongue of the trailer at the conventional elevation.

Such hitches have been developed in the prior art, but they have not been entirely satisfactory, due to a number of limitations. They have not been provided with any means for releasing the hitch from the trailer tongue, to allow the trailer to be used with other hitches, and the hitch itself has projected relatively far forwardly of the trailer, which takes up space and hampers moving and parking the trailer.

It is desirable to provide a trailer hitch which can overcome the aforesaid disadvantages of the prior art hitches.

SUMMARY OF THE INVENTION

Accordingly it is a principle object of the present invention to provide a trailer hitch having a U-shaped tow beam which is readily removable from the trailer when desired.

Another object of the present invention is to provide such a trailer hitch in which the U-shaped tow beam may be selectively swivelled about a vertical axis near the trailer, to permit the storage of the two beam adjacent to the forward end of the trailer.

A further object of the present invention is to provide such a hitch which is adjustable in a vertical direction.

These and other objects and advantages of the present invention will become manifest upon an examination of the following description and the accompanying drawings.

In one embodiment of the present invention there is provided a U-shaped tow beam having generally vertically extending sections at the forward and rearward ends threof, means for releasably attaching the forward end of the tow beam to a connector mounted on the bed of a pickup truck, a tongue receiving assembly secured to the rear end of the tow beam, and means mounted on the tongue receiving assembly for releasably securing the tongue of the trailer thereto, the tow beam having a selectively disengagable connection at its rear end for permitting removal of the tow beam from the tongue receiving assembly.

BRIEF DESCRIPTION OF THE DRAWINGS

Reference will now be made to the accompanying drawings in which.

DESCRIPTION OF THE PREFERRED EMBODIMENTS

Figure 1:
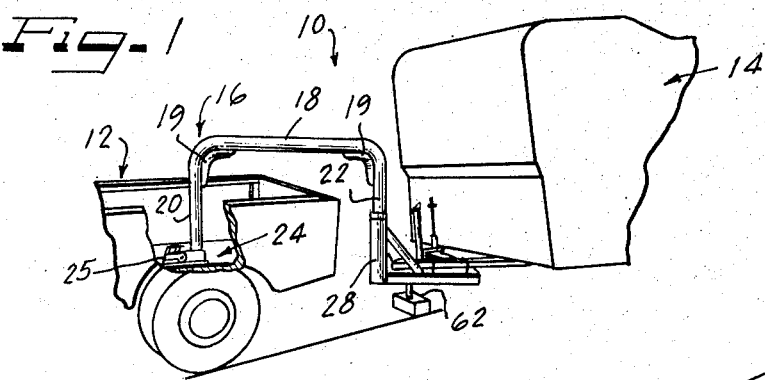
FIG. 1 is a perspective view illustrating a preferred embodiment of the present invention connected in operative association between a pickup truck and a trailer.

Referring now to FIG. 1 a hitch 10 embodying the present invention is illustrated in operative position between a pickup truck 12 and a trailer 14. The trailer 14 may be of the type commonly known as a travel trailer and the pickup truck 12 may be of any known type such as for example a ½ ton pickup truck. The hitch 10 comprises a U shaped tow beam 16 having a generally horizontal midportion 18 a downwardly extending forward arm 20 and a downwardly extending rear arm 22. The beam 16 is preferably formed of hollow tubular material of great strength, such as steel and is preferably reinforced at the bends at either end of the horizontal portion 18 by means of gussets 19 welded thereto.

The lower end of the forward arm 20 terminates in a ball and socket connector 24 of the conventional sort. The socket 25 of the connector 24 is secured to the lower end of the arm 20 by welding or the like, and cooperates with a ball (not shown) mounted in fixed relation with the bed of the pickup truck 12. The connector 24 allows the beam 16 to swivel about the ball as desired, but restrains lifting of the beam 16 upwardly relative to the ball when the connector 24 is secured in operative condition. The ball is preferably mounted on the pickup truck 12 at a location directly above the midpoint of the rear axle. The hitch 10 can then rotate about the center of the rear axle, to facilitate turning and backing maneuvers.

The rear arm 22 is slidably received in an upstanding tube 28. A pin 30 having a head 32 at one end thereof passes through an alinged pair of apertures provided in the tube 28, and also through aligned apertures in the arm 22. An aperture provided in the end of the pin 30 receives a spring-type cotter pin 34 to releasably secure the pin 30 in the position illustrated in FIG. 4.

Figure 5:
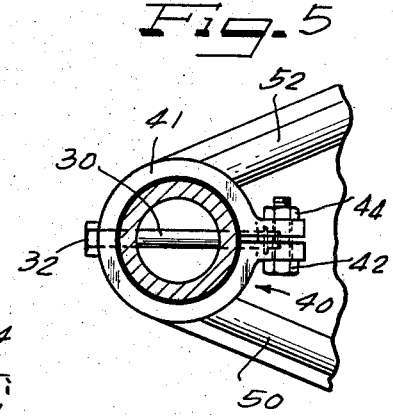
FIG. 5 is a horizontal section of a portion of the hitch taken along the line V—V in FIG. 4.

A plurality of pairs of aligned apertures 36 are provided at spaced locations along the arm 22 to cooperate with the pin 30. The arm 22 is thus adjustable to a variety of levels relative to the upstanding tube 28, which permits vertical adjustment of the arm 22 relative to the tube 28. A collar 40 is adjustably secured to the arm 22 at a position immediately above the upper end of the tube 28. The collar is best shown in FIg. 5 and is formed as a hoop-shaped member 41 wrapped around the tube 22 and having its two ends interconnected by means of a cooperating bolt 42 and nut 44. The bolt 42 passes through aligned apertures in the ends of the member 41, and tightening the nut 44 relative to the bolt 42 effects a clamping action which secures the collar 40 in place on the arm 22. When it is desired to move the location of the collar 40, the bolt 44 is loosened, after which the collar may be repositioned and the bolt 44 re-tightened to maintain the collar in that position.

Figure 4:
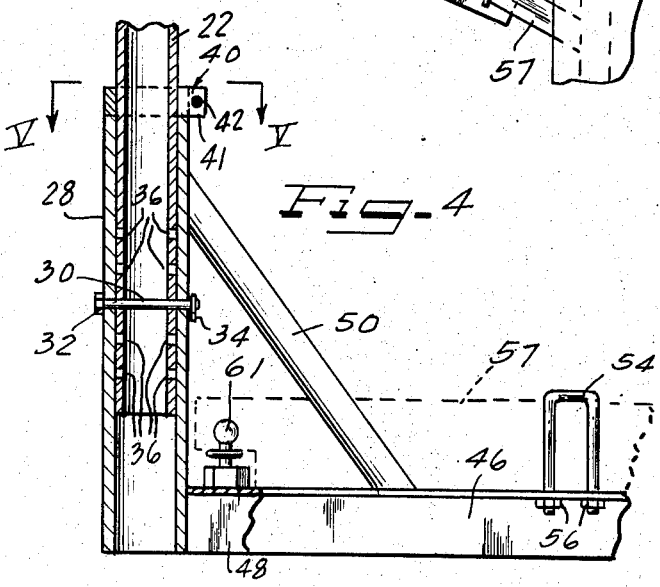
FIG. 4 is a side elevation, partly in cross-section, of a portion of the hitch illustrated in FIGS. 2 and 3.

When the pin 30 is withdrawn from the location illustrated in FIG. 4, the arm 22 is supported relative to the pipe 28 by means of the collar 40. With the pin 30 withdrawn, the tow beam 16 may be rotated about the axis of the tube 28, to permit the beam 16 to be swung into a position adjacent the front end of the trailer 14, for storage. With the pin 30 in position, however, the tow beam 16, is maintained in a position in which the upper portion 18 of the beam extends directly forward relative to the trailer 14.

Figure 2:
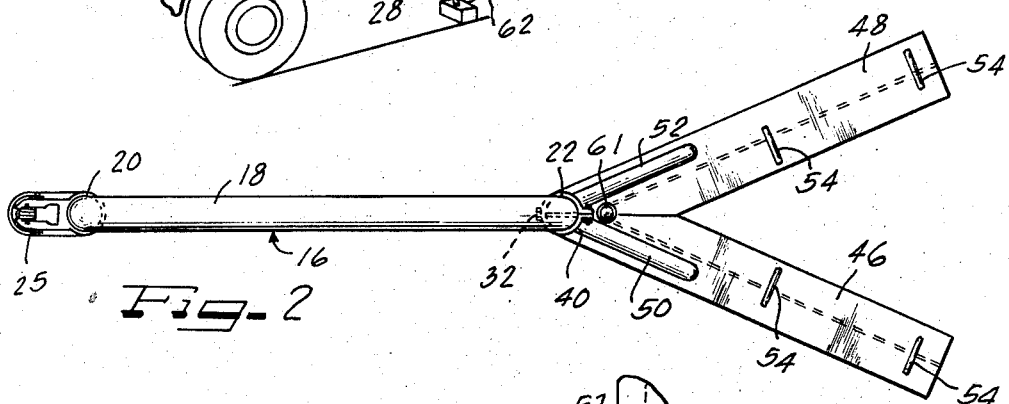
FIG. 2 is a plan view of the hitch illustrated in FIg. 1, with the tongue of the trailer omitted.
Figure 3:
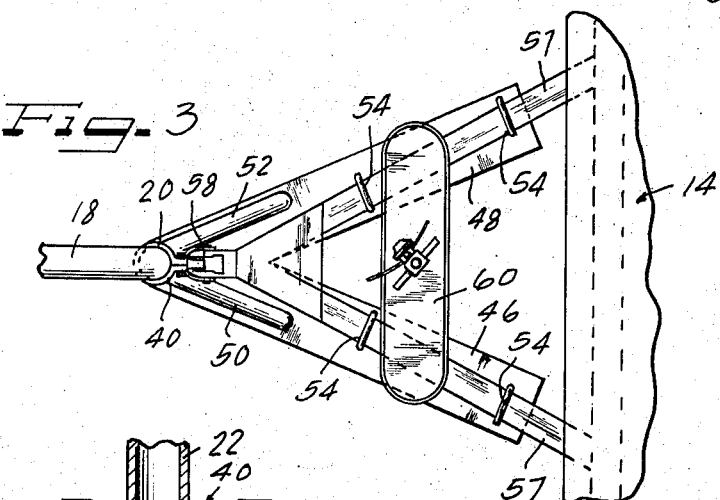
FIG. 3 is a partial plan view of the hitch illustrated in FIG. 2 showing the tongue of the trailer in place.

To the lower end of the upstanding tube 28 is secured a tongue receiving assembly comprising a pair of bars 46 and 48, having a T-shaped cross-section, which base may be formed, for example, by removing one flange of an I beam. The bars 46 and 48 are welded together in a V-shaped arrangement, as best illustrated in FIG. 2, the apex of the V being secured by welding or the like to the lower end of the tube 28. A pair of struts 50 and 52 are also welded between the tube 28 and the bars 46 and 48, respectively, in order to form a rigid assembly in which the tube 28 is rigidly connected to the bars 46 and 48 and extends in a direction normal to the plane defined by the upper surface of the bars 46 and 48. The arms 46 and 48 are provided with a plurality of U bolts 54, which cooperate with spaced vertical apertures in the bars 46 and 48. The U bolts 54 are provided with threads at each end thereof, and a pair of nuts 56 are threaded on the ends of the U bolts 56 so that when the nuts 56 are tightened the U bolts 54 are drawn downwardly toward the arms 46 and 48, and secure the tongue of the trailer thereto.

The tongue of the trailer has a Y-shaped assembly including a pair of arms 57 which are connected at their forward ends, where there is a socket 58 of the standard ball and socket type connector. A ball 61 for such socket is secured to the upper surface of the bars 46 and 48, where they are joined together, at an elevation spaced above the upper level of the bars 46 and 48. The height of the ball 61 is such as to engage the socket of a standard trailer tongue, while the lower surface of the tongue arms 57 are at approximately the same level as the top surface of the bars 46 and 48. This permits the ball 61 to position the tongue relative to the tongue receiving assembly, while the U bolts 54 transmit the load from the tongue to the tongue receiving assembly, and prevent relative movement therebetween. A shelf 60 is normally provided in association with the trailer tongue, secured above the arms 57. The shelf 60 is normally used to support butane bottles or the like. The U bolts 54 are located rearwardly and forwardly of the shelf 60, so that its presence does not interfere with the present invention.

From the above description it will be appreciated that the hitch of the present invention facilitates the towing of a trailer by a pickup truck, with the hitch adapted to swivel about a vertial axis centrally located over the rear axle of the truck. When desired, the U-shaped tow beam may be removed, or rotated about the axis near the front of the trailer tongue into a storage position at the front of the trailer. In either case before the tow beam 16 is disconnected, the tongue of the trailer 14 is supported by means of a conventional jack 62 or the like. It will also be appreciated that the hitch 10 of the present invention may be disassembled from the trailer 14 and used with a different trailer, simply by disconnecting the U bolts 54 and the connector 58.

Although the tow beam 16 has been illustrated and described above as being U-shaped, with generally vertical forward and rear arms 20 and 21, such shape is not essential, and a V-shape may be employed instead, the apex of the V being high enough to clear the tail gate of the truck 12. Whatever shape of beam is employed, the rear arm 22 should be spaced far enough from the swiveling axis through the forward connector 24 to permit the hitch to swivel beyond the rear corners of the truck 12.

I claim as my invention:

1. In a trailer hitch for a pickup truck, the combination comprising: a U-shaped tow beam with inclined sections at the forward and rear ends thereof, such tow beam being adapted to pass over the tailgate of such truck, a tongue receiving assembly having a generally horizontal extending bifurcated member, means releasably securing said tongue receiving assembly to the rear end of said beam, means mounted on said bifurcated member for releasably securing the tongue of said trailer to said bifurcated member, the rear end of said U-shaped beam being oriented generally vertically, said tongue receiving assembly having a generally vertically extending member secured thereto, and selectively operable means for vertically adjustably securing the rear end of said U-shaped beam to the vertically extending member of said tongue receiving assembly.

2. Apparatus according to claim 1, wherein said U-shaped beam is formed of a tubular body having a generally circular cross-section, and the vertically extending member of said tongue receiving assembly being formed of a tubular body having a generally circular cross-section, the tubular body of said tongue receiving assembly being larger than the tubular body of said beam, whereby the rear end of said beam is received within the tubular body of said tongue receiving member.

3. Apparatus according to claim 2, wherein said adjustable securing means comprises a pin adapted to be received in aligned apertures in the rear end of said U-shaped beam and in the tubular body of said tongue receiving body.

4. Apparatus according to claim 3, wherein the rear end of said beam has a plurality of spaced apart pairs of apertures for receiving said pin.

5. Apparatus according to claim 2 including a collar member adjustably secured to the rear end of said beam at a location immediately above the upper end of the tubular body of said tongue receiving assembly.

6. Apparatus according to claim 5 wherein said collar includes selectively operable clamp means, whereby said collar is adjustable along the length of said U-shaped beam.

7. In a trailer hitch for a pickup truck, the combination comprising: a U-shaped tow beam with inclined sections at the forward and rear ends thereof, such tow beam being adapted to pass over the tailgate of such truck, a tongue receiving assembly having a generally horizontally extending member, means releasably securing said tongue receiving assembly to the rear end of said beam, means mounted on said horizontally extending member for releasably securing the tongue of said trailer to said horizontally extending member, said U-shaped tow beam having a generally vertically extending portion, and including means for adjustably selecting the length of said vertically extending portion of said tow beam in order to select the difference in vertical elevation between said pickup truck and said tongue.

8. Apparatus according to claim 7, wherein said tongue receiving assembly comprises a V-shaped member having a generally plane upper surface for supporting the tongue of a trailer thereon, each leg of said V-shaped member having a plurality of clamp means for clamping said tongue into fixed relation with said tongue receiving assembly.

9. Apparatus according to claim 8, including the ball portion of a ball and socket connector mounted on said upper surface.

10. Apparatus according to claim 7, wherein said vertically extending portion is the rear end of said U-shaped beam.

11. Apparatus according to claim 10, wherein said tongue receiving assembly has a generally vertically extending member secured thereto and including selectively operable means for vertically adjustably securing the rear end of said U-shaped beam to the vertically extending member of said tongue receiving assembly.

* * * * *